US008849431B2

(12) United States Patent
Thomson et al.

(10) Patent No.: US 8,849,431 B2
(45) Date of Patent: Sep. 30, 2014

(54) CONFIGURATION BASED PROGRAMMABLE LOGIC CONTROLLER (PLC) PROGRAMMING

(75) Inventors: Keith Thomson, Grand Junction, CO (US); Paul Brennan, Grand Junction, CO (US)

(73) Assignee: Flow Data, Inc., Grand Junction, CO (US)

( * ) Notice: Subject to any disclaimer, the term of this patent is extended or adjusted under 35 U.S.C. 154(b) by 691 days.

(21) Appl. No.: 13/038,368

(22) Filed: Mar. 1, 2011

(65) Prior Publication Data

US 2012/0226368 A1 Sep. 6, 2012

(51) Int. Cl.
*G05B 19/42* (2006.01)
*G05B 11/01* (2006.01)
*G05B 19/05* (2006.01)
*G05B 19/042* (2006.01)

(52) U.S. Cl.
CPC .......... *G05B 19/0426* (2013.01); *G05B 19/056* (2013.01); *G05B 2219/23297* (2013.01)
USPC .............................................. 700/87; 700/23

(58) Field of Classification Search
None
See application file for complete search history.

(56) References Cited

U.S. PATENT DOCUMENTS

| 7,117,335 | B2* | 10/2006 | Sailer et al. ................... 711/173 |
| 7,571,054 | B2 | 8/2009 | Newman |
| 7,762,321 | B2 | 7/2010 | Fesi et al. |
| 7,878,250 | B2 | 2/2011 | Sheldon |
| 8,235,107 | B2 | 8/2012 | Fesi et al. |
| 8,275,549 | B2 | 9/2012 | Ramirez Sabag et al. |
| 2004/0010326 | A1* | 1/2004 | Schuster ......................... 700/79 |
| 2005/0085928 | A1* | 4/2005 | Shani ............................. 700/18 |
| 2006/0032533 | A1* | 2/2006 | Sheldon ........................ 137/386 |
| 2009/0055029 | A1 | 2/2009 | Roberson et al. |
| 2010/0295673 | A1 | 11/2010 | Ahmad |
| 2011/0066297 | A1 | 3/2011 | Saberi et al. |
| 2011/0098854 | A1* | 4/2011 | Tarragona et al. ............ 700/245 |
| 2012/0215364 | A1 | 8/2012 | Rossi |
| 2013/0058798 | A1 | 3/2013 | Fesi et al. |

* cited by examiner

*Primary Examiner* — Sean Shechtman
(74) *Attorney, Agent, or Firm* — Dorr, Carson & Birney, P.C.

(57) ABSTRACT

Systems and methods for dynamic reconfiguration of an application of a programmable process controller are provided. According to one embodiment, a configuration device reads a new configuration file, which contains information regarding a desired number of instances and desired configurations of modules of the process control application, from its local memory. The configuration device then causes the application to instantiate the desired number of instances with the desired configurations by replacing an existing configuration file of the programmable process controller with the new configuration file. In another embodiment, a process control application of a programmable process controller dynamically configures its structure and memory allocation usage. During startup of the application, a configuration file is read that defines a number of instances and configurations of modules for the application. Based thereon, the application creates the defined number of instances of the modules having the defined configurations.

18 Claims, 11 Drawing Sheets

RootConfig 400

| Statistics | |
|---|---|
| EventhandlerType? | N/A, Pointed by 41999 |
| AddressField? | HoldingDbase? |
| BlockSize? | N/A |
| ReserveSize? | N/A, Config Specific |

Offsets:

| | | |
|---|---|---|
| +0 | Rebuild Flag, !=0 means Reload config | uint16 |
| +1 | Length of Module List | uint16 |
| +2 | First Module Type | uint16 |
| +3 | First Module Address | uint16 |
| +4 | Second Module Type | uint16 |
| +5 | Second Module Address | uint16 |

} 410

Pattern repeats until Length has been met.

Root Module Definition 610

| Modbus Address 611 | Value 612 | Notes 613 |
|---|---|---|
| 41999 | 40501 | Address for Root Config Module and only hard coded address in system |
| 40501 | 0 | Rebuild Flag |
| 40502 | 9 | Length of module list (number of modules) |
| 40503 | 7 | First Module type - (type 7 is defined as RTU info module) |
| 40504 | 40640 | Base address of RTU Info Module (type 7) |
| 40505 | 23 | Second Module type - (type 23 is defined as Display Power Module) |
| 40506 | 40630 | Base address of Display Power Module (type 23) |
| 40507 | 19 | Third Module type - (type 19 is Analog Battery Voltage Input module) |
| 40508 | 40680 | Base address of Analog Battery Voltage Input Module (type 19) |

...

Leaf Module Definition 620

| Modbus Address 621 | Value 622 | Notes 623 |
|---|---|---|
| 40680 | 30006 | Raw Input Address - 30006 equals I/O Input #5 |
| 40681 | 0 | Raw Minimum |
| 40682 | 32767 | Raw Maximum |
| 40683 | 1 | Flags |
| 40684 | 0 | Scale Minimum - Integer |
| 40685 | 0 | Scale Minimum - Float |
| 40687 | 32 | Scale Maximum - Integer |
| 40688 | 32 | Scale Maximum - Float |
| 40690 | 2006 | Output Event or Register Address |
| 40691 | 0 | Instrument failure Event or Register Address |

CONFIGURATION BASED PROGRAMMABLE LOGIC CONTROLLER (PLC) PROGRAMMING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2011, Flow Data, Inc.

BACKGROUND

1. Field

Embodiments of the present invention generally relate to the field of process control applications and programmable process controllers (e.g., Process Logic Controllers (PLCs)). In particular, various embodiments relate to methods for allowing a collection of modules of a PLC application to dynamically build a desired process control application based on an externally read configuration.

2. Description of the Related Art

Historically PLCs have been programmed by Ladder Logic, IEC 61131 compliant methods, or C/C++ compiled applications. These methods require specialized personnel with programming knowledge and training.

Application written with traditional methods require programming changes when the function of the program is altered. This can be a major issue if the required change needs to occur in the field where a qualified programmer is not available.

A traditionally programmed system is designed and programmed to support a defined and finite set of features and operations, being rigid and constant in its structure and memory allocation usage.

SUMMARY

Systems and methods are described for dynamic reconfiguration of an application stored within a programmable process controller. According to one embodiment, a method is provided for reconfiguring a process control application stored in a memory of a programmable process controller. A configuration device reads a new configuration file from a memory of the configuration device, which contains information regarding a desired number of instances and desired configurations of modules of the process control application. The configuration device then causes the process control application to instantiate the desired number of instances of the modules with the desired configurations by replacing an existing external configuration file stored in the memory of the programmable process controller with the new configuration file.

In another embodiment, a method is provided for a process control application running on a programmable process controller to dynamically configure its structure and memory allocation usage. During startup of the process control application, a configuration file associated with the process control application is read that defines a number of instances and configurations of modules of the process control application. Based thereon, the process control application creates the defined number of instances of the modules having the defined configurations.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 4 illustrates a sample of a RootConfig module definition in accordance with an embodiment of the present invention.

FIG. 5 illustrates a sample of an AnalogInputModule definition in accordance with an embodiment of the present invention.

FIG. 6 illustrates a sample of a portion of an external Modbus configuration based on the module definitions of FIGS. 4 and 5 in accordance with an embodiment of the present invention.

DETAILED DESCRIPTION

Figure 1:
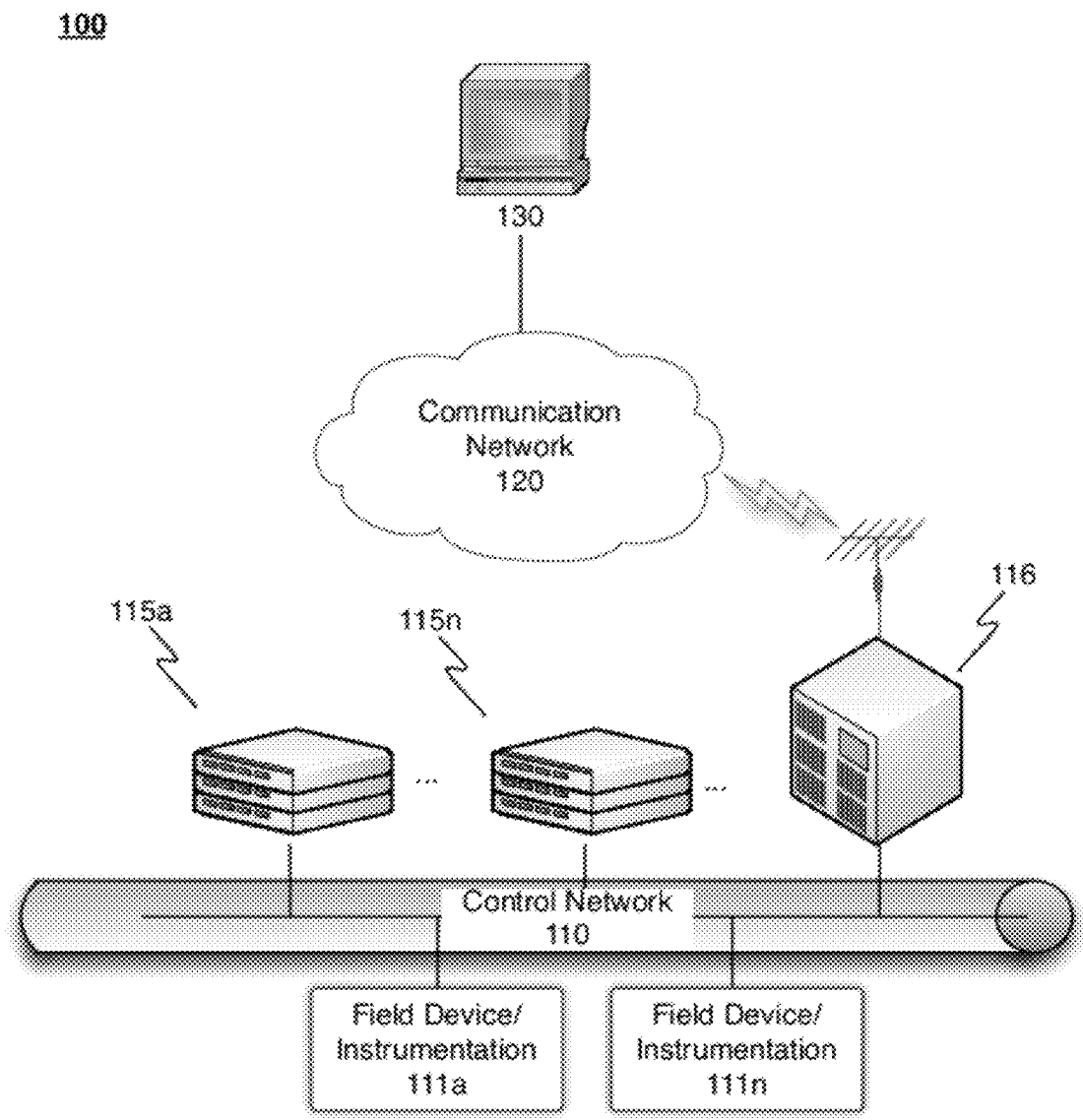
FIG. 1 is a block diagram conceptually illustrating a simplified process control architecture in which embodiments of the present invention may be employed.

Systems and methods are described for dynamic reconfiguration of a PLC-based process control application. According to one embodiment, a PLC is programmed by providing an process control application that is a collection of modules, each of which performs a task/operation or collections of tasks/operations, which will behave according to an externally read configuration. Upon bootup, the application creates a dynamic structure of the number and configuration of each module that exists in the external configuration. The result is a dynamic method of providing a program for a PLC without having to edit the actual PLC programming code.

According to embodiments of the present invention, a process control application may be represented as a collection of modules, each having a corresponding module definition, which provides a layout and interface to adjust any internal settings applicable to that module. The definition may also provide a mapping for any output or data item that the module presents during operation.

In one embodiment, during startup of the process control application, instances of the modules list are instantiated as per the configuration that is read. This provides for a system that is object-oriented. The code for one module can be used many times (instances) with alternate configurations within a given PLC.

Also, PLCs running the same application can be given different personalities in effect as each can be configured to operate as desired by providing different configuration files. Standard protocol communications modules (e.g., Modbus RTU or Modbus TCP) and event driven communication methods provide a method for more than one PLC to be used to perform a group of associated or un-associated tasks with the same application (similar or different configurations).

In one embodiment, a process control application provides a structured module tree with parent and child relationships.

According to various embodiments, output from each module of the process control application is presented in standard communication protocol (e.g., Modbus RTU or Modbus TCP) to facilitate open external interface support (local operator interface, remote automation server human machine interface).

Importantly, although various embodiments of the process control application may be discussed in the context of oil or gas well automation, such a dynamically reconfigurable application is equally applicable to various other environments, including, but not limited to oil or gas extraction, transportation, and refining; energy management; building management; machine safety; packaging control (e.g., bagging, boxing, labeling and the like); material handling, hoisting control; Heating, Ventilation and Air Conditioning (HVAC); wastewater treatment and other industrial automation, production facility and/or process control environments.

Furthermore, while some examples are given with reference to PLCs, the dynamic reconfiguration techniques described herein are equally applicable to other types of programmable process controllers and other devices in which or with which such programmable processors might be integrated, such as multivariable transmitters (MVTs), pad controllers, well controllers, RTUs and the like.

Finally, embodiments of the present invention are described with reference to a particular external Modbus configuration example, but the invention is not limited to this precise form of external configuration. Those skilled in the art will recognize various other alternative external configuration mechanisms, including (i) reading of a text file, a comma separated value file or eXtensible Markup Language (XML) file, by the process control application, stored in a configuration device or (ii) reading of a text file, comma separated value file or XML file stored within a memory of a programmable process controller in which the process control application resides, or read from a remote location at start or re-start (a host server could determine the task of the PLC at will).

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a non-transitory machine-readable storage medium tangibly embodying thereon instructions, which may be used to program a computer (or other electronic devices) to perform a process. The non-transitory machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, volatile or nonvolatile (e.g., battery backed up Complementary Metal Oxide Semiconductor (CMOS)) random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to Ladder Logic, IEC 61131 compliant methods, object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as but not limited to an FTP client, a Modbus Slave client, or an OPC (ODBC for Process Control) server client.

The term "configuration device" generally refers to a device having a memory in which a configuration file for a process control application is stored. Non-limiting examples of configuration devices include mobile wireless devices, including, but not limited to tablet computers, smart phones and laptop computers; Universal Serial Bus (USB) flash drives; and the like.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The phrase "programmable process controller" generally refers to a digital computer that is optimized for control tasks (e.g., integrated input/output (I/O) for sampling/monitoring signals from external devices and providing command signals to external devices) and/or an industrial environment (e.g., designed to withstand vibrations, temperature, humidity and noise and comply with specific electromagnetic interference (EMI), Radio Frequency Interference (RFI) and/or electromagnetic compatibility (EMC) requirements). A remote terminal unit (RTU) and a programmable logic controller (PLC) are two examples of programmable process controllers. Programmable process controllers are capable of running a compiled program. In embodiments of the present invention, the structure of the program, the functionality of the program, the type and number of objects/modules instantiated by the program and the like can be dynamically reconfigured without changing and/or recompiling the program by using a configuration file.

The term "responsive" includes completely or partially responsive.

The term "server" generally refers to an application, program, process or device in a client/server relationship that responds to requests for information or services by another program, process or device (a server) on a network. The term "server" also encompasses software that makes the act of serving information or providing services possible.

FIG. 1 is a block diagram conceptually illustrating a simplified process control architecture 100 in which embodiments of the present invention may be employed. Since embodiments of the present invention are not limited to any particular process control environment, for sake of brevity, the simplified process control architecture 100 is described at a high level. Those skilled in the art will recognize the applicability of the methodologies described herein regardless of the specific application or context. For example, embodiments of the present invention are equally applicable in the context of oil or gas extraction, transportation, and refining; energy management; building management; machine safety; packaging control (e.g., bagging, boxing, labeling and the like); material handling, hoisting control; Heating, Ventilation and Air Conditioning (HVAC); wastewater treatment and other industrial automation, production facility and/or process control environments.

In the present example, multiple programmable process controllers (e.g., PLC 115a, PCL 115n and RTU 116) are coupled in communication with field devices/instrumentation 111a-111n (e.g., motors, solenoids, drivers, sensors, actuators, multi variable transmitters and the like—depending upon the context) via a control network 110 (e.g., typically using an electrical signal or ubiquitous physical network, such as Ethernet, and a network communication protocol standard, such as Modbus Plus, Modbus TCP/IP, Modbus RTU, BACnet, DeviceNet, LONWorks and the like) to allow input signals to be received from and commands to be provided to field devices/instrumentation 111a-111n.

Depending upon the memory, I/O and processing requirements of the industrial automation or process control environment at issue, the PLCs 115a-115n might be small, non-modular PLCs (also known as fixed I/O PLCs), such as the MELSEC FX3U compact (available from Mitsubishi Electric), which generally accommodate a smaller number of inputs and outputs in fixed configurations; or a modular/rack type PLC having a chassis or bases/racks that allow installation of multiple I/O modules, and which typically accommodate more complex applications. Two non-limiting examples of such modular type PLCs include the Modicon Quantum rack/backplane system (available from Schneider Electric), which can be configured with the desired number of Modicon Quantum Unity stand alone processor modules, discrete input modules, analog input modules and hot standby modules; and the PLC-5/1771 system (available from Rockwell Automation, Inc.), which can also be configured with the desired number of PLC-5 processor modules, 1771 communication modules, 1771 I/O modules and a 1771 power supply in a 1771 chassis platform.

As is typical, in the present example, raw or processed data may be communicated to a local or remote supervisory system through a communication network 120 (e.g., the Internet).

Figure 2:
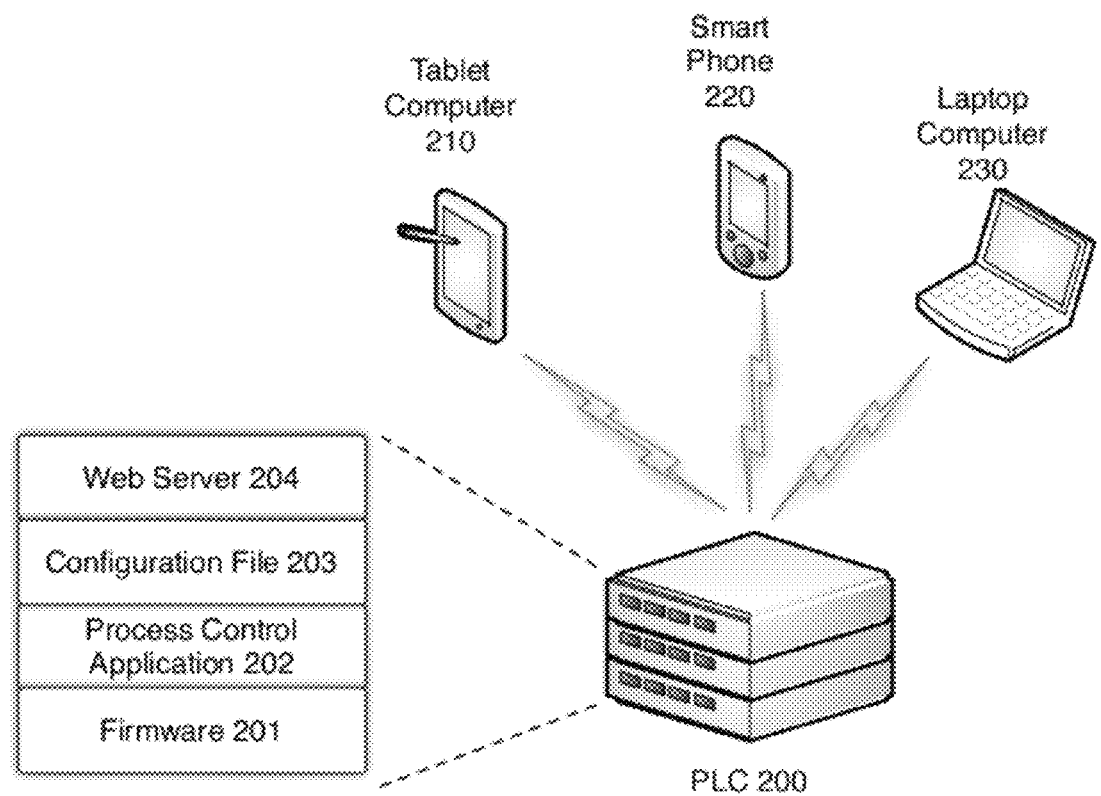
FIG. 2 illustrates exemplary configuration devices and PLC software/firmware layers in accordance with an embodiment of the present invention.

FIG. 2 illustrates exemplary configuration devices 210, 220 and 230 and software/firmware layers 201-204 of a PLC 200 in accordance with an embodiment of the present invention. In the present example, the configuration of PLC 200 can be changed by means of direct physical (e.g., RS-232 or the like) or wireless communication (e.g., Bluetooth or the like) with a mobile wireless device, including, without limitation, a tablet computer 210 (e.g., an iPad, Xoom or the like), a smart phone 220 (e.g., an iPhone, BlackBerry and Android-based phone) or a laptop computer 230.

In the present example, PLC 200 includes firmware 201, a process control application 202, a configuration file 203 (external to the process control application 202) or an optional web server 204. Firmware 201 represents, for example, PLC manufacturer code stored in read-only memory of PLC 200 to support various types of smart devices and I/O functionality.

According to embodiments of the present invention, process control application 202 is a compiled modular, object-oriented program written in a high-level programming language (e.g., the C or C++ programming language). As described in further detail below, in one embodiment, process control application 202 is a collection of modules (e.g., a superset of that which might be needed by any particular PLC), each with a module definition, which provides a layout and interface to adjust any internal settings applicable to that module. The module definition may also provide a mapping for any output or data item that the module presents during operation.

As described further below, in various embodiments of the present invention, during startup, process control application 202 is programmed to locate and read configuration file 203 to determine its structure and memory allocation usage. Configuration file 203 may contain information regarding a desired number of instances and desired configurations of modules defined by process control application 202. In this manner, the structure and memory allocation usage of process control application 202 can be dynamically reconfigured at startup by simply editing various parameters of configuration file 203 or replacing configuration file 203 with a new configuration file.

In one embodiment, web server 204 is integrated within PLC 200. Web server 204 enables, for example, physically connected or wirelessly connected configuration devices to access pre-programmed web pages designed to display and allow editing of parameters of configuration file 203 using standard Internet/Web protocols.

According to embodiments of the present invention, configuration devices 210, 220 or 230 may make a Bluetooth connection with PLC 200 and thereafter use a browser based interface provided by web server 204 to read a current configuration file (e.g., configuration file 203) from PLC 200, write a new or edited configuration file to PLC 200, read a current process control application (e.g., process control application 202) from PLC 200, write a new or edited process control application to PLC 200 or otherwise read from or write to data/status registers or memory of PLC 200.

Notably, while reconfiguration of PLC 200 can be accomplished by providing PLC 200 with a new or revised process control application, in embodiments of the present invention, the structure (e.g., type of module instances), memory allocation (e.g., number of module instances) and intended function of process control application 202 can be dynamically reconfigured without editing and recompiling process control application 202 by simply modifying configuration file 203, which is read at startup by process control application to configure itself as described further below. Advantageously, in this manner, it is not necessary to send skilled PLC programmers into the field to reconfigure PLC 200. Rather, using embodiments of the present invention, a lesser skilled technician can enhance or otherwise change the functionality of process control application 202 by simply using a browser-based interface, for example, to edit or replace configuration file 203.

Figure 3:
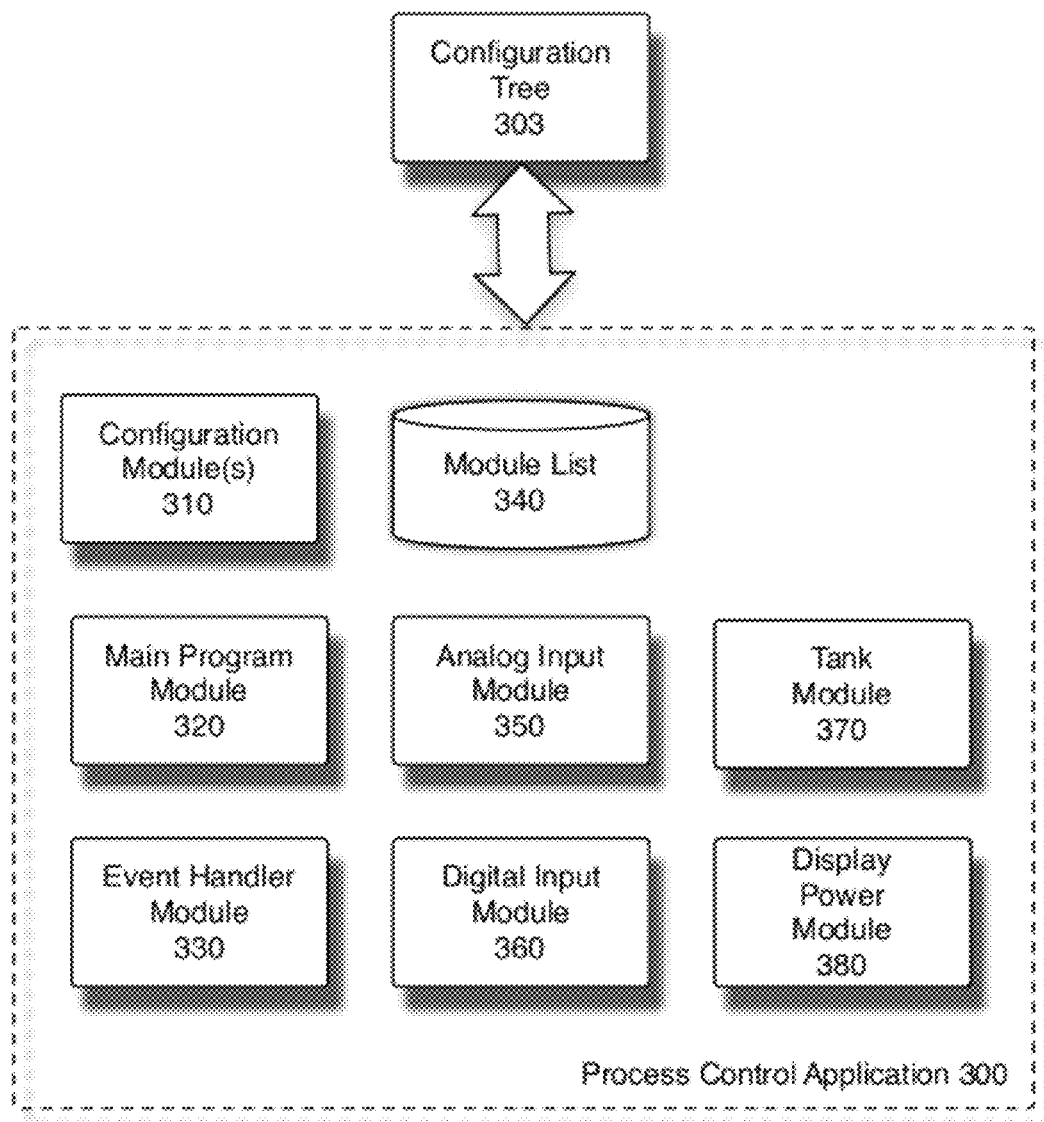
FIG. 3 is a block diagram conceptually illustrating interaction among various functional units of a dynamically reconfigurable process control application in accordance with an embodiment of the present invention.

FIG. 3 is a block diagram conceptually illustrating interaction among various functional units of a dynamically reconfigurable process control application 300 in accordance with an embodiment of the present invention. According to one embodiment, process control application 300 defines a number of classes or modules that can be instantiated based on directives provided by an external configuration file (e.g., configuration tree 303) by one or more configuration modules 310.

In accordance with one embodiment, after programmable control processor (e.g., PLC 200) boots up, process control application 300 is started up, which instantiates main program module 320. Main program module 320, reads the root portion of the configuration and then instantiates an event handler module 300 (e.g., RootEvtHandler, or rather a child class of this known as a RootConfig object), which is specialized for the hardware (e.g., the type of PCL processor) process control application 300 is compiled to.

According to the present example, configuration module(s) 310 are the next layer on top of the event systems. In one embodiment, configuration module(s) 310 wrap up a platform independent or less dependent modules into a modules compatible with the hardware platform at issue through sub-classing, thereby tailoring the modules to the environment in which process control application 300 finds itself.

In accordance with one embodiment, during startup configuration processing, process control application 300 instantiates one or more configuration modules 310, e.g., a RootConfig object and a RunConfig object, which are responsible for processing configuration tree 303. According to one embodiment, configuration tree 303 represents a configuration file external to process control application 300 that has been previously written by a configuration device into a Modbus address space within the programmable process controller in which process control application 300 resides. In alternative embodiments, configuration tree 303 may be a text file or XML file stored in a memory associated with a configuration device with which the programmable process controller is in communication or a removable, portable memory stick (e.g., a USB flash drive or the like) physically interfaced with the programmable process controller. Alternatively, configuration tree 303 may be a text file or XML file that has been previously stored, by a configuration device or a removable, portable memory stick, within a memory of a programmable process controller in which the process control application resides.

In one embodiment, the instantiated configuration module 310 reads configuration tree 303 to determine if the specified configuration is valid. A status flag (not shown), which can be monitored external to process control application 300, can be utilized to provide status.

In one embodiment, RootConfig is created at the start of process control application. It inspects a set address in a memory associated with the programmable process controller (for example, Modbus address 41999) that contains a pointer to a RootConfig data structure (not shown). As described further below, according to one embodiment, the first word of this data structure is a count of active modules (e.g., a number of modules desired to be instantiated), and the following words consist of a module type identifier, followed by a relative or absolute address for the module specified. According to one embodiment, if the address is below 10000, then it is considered a relative address from the beginning of the configuration record. If it is above 40000, it is considered absolute. Process control application 300 then instantiates an object of the specified type and adds it to module list 340. If the module at issue is a Run or a Tank, a Run or Tank number of the created object is identified and a pointer to it is added to the Run or Tank lists (not shown). The run and tank lists are used for indexed events. For example, if an event has a run and tank value of 0, then it may only be sent to the RootConfig object's own modules. If it is −1, then it may be sent to all runs or all tanks as well as the RootConfig objects. If it is any other number, then it may be sent to that run, along with the Root-Config objects.

According to one embodiment, another instance of configuration module 310, RunConfig module, does roughly the same thing as RootConfig, except it first identifies its run number and stores it at the beginning of its record. RunConfig has no support for child runs. It merely dispatches all events to all of its child modules, and watches for changes in configuration.

In one embodiment, after main program module 320 and configuration modules 310 complete startup configuration processing, main program module 320 enters a main event loop in which event handler module 330 repeatedly sends time event (e.g., EVTTIME) methods to the root object of the module list 340. These time events then trigger all other events in program control application. In one embodiment, event handler objects do not have access to the system clock (not shown). According to one embodiment, in order to permit synthetic testing, the clock time (not shown) is passed in via a time event from the main event loop to the event driven code.

Other tasks or features can be added to the base process control application 300 in the form of one or more additional modules. According to one embodiment, the original collection of modules and the fact that all new modules carry a unique module identification number insures backwards compatibility.

Additionally, external interfaces can be created easily as each module has a set definition stating what controls exist in the module and what data the module outputs.

As alluded to above, in one embodiment, the interaction between modules is based on an event driven system to provide for efficiency on memory and CPU usage. The event driven interaction also lends itself to efficient "inter" PLC communication between multiple PLCs using the application. Communication within the structure is handled by an event driven system. According to one embodiment, events are sent via a recursive function call to the root of the structure and then are distributed in a depth first manner. Objects ignore any event that they do not need and return immediately. To avoid runaway recursion, events are only sent in response to an EVTTIME event, which is the main loop of process control program 300. Events themselves may either be statically allocated in the object that sends them or allocated on the stack by a method in that object. Events are disposed of upon return from the event call, so if another object wishes to queue an event it makes a local copy. Event objects may keep a size variable to allow for copying. Event objects also contain generic access methods to allow for extraction of the data in any format, including conversion of units and contains variables indicating the quality of the value.

In one embodiment, every other module has a configuration piece as well, and is instantiated with a pointer to its own configuration. Through this method, process control application 300 dynamically configures itself at startup with only a single hard-coded address. All modules then handle and understand their own configuration.

In various embodiments, another notable aspect of the system is support for synthetic testing. Every module includes 5 source files along with a makefile. There is a source and header file for the actual module itself, a source and header file for the synthetic test that verifies the operation of the module, and a final source file to be compiled when that test should be run individually. If one wishes to run all tests in the system, one merely adds the modules to the unit-test module and compiles it. Having full testing suites on every module can prevent module level regressions in functionality in an environment isolated from the rest of the program.

In the current simplified example, in addition to configuration modules 310, event handler module 330, module list 340 and main program module 320, process control application 300 includes various other modules for performing process control/monitoring tasks, including an analog input module 350, a digital input module 360, a tank module 370 and a display power module 380. While for sake of brevity only a limited set of exemplary modules are illustrated in the present example, those skilled in the art will appreciate that numerous other types of modules may be provided, including, but not limited to digital output control, PID control, Analog output control, alarming, data logging, digital cause and effect control, flow totalizer, pump control.

In one embodiment, the functionality of one or more of the above-referenced functional units may be merged in various combinations. For example, configuration module(s) 310 and event handler module 330 may be merged. Moreover, the functional units can be communicatively coupled using any suitable communication method (e.g., message passing, parameter passing, and/or signals through one or more communication paths etc.). Additionally, the functional units can be physically connected according to any suitable interconnection architecture (e.g., fully connected, hypercube, etc.).

According to embodiments of the invention, the functional units can be any suitable type of logic (e.g., digital logic) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

FIG. 4 illustrates a sample of a RootConfig module definition 400 in accordance with an embodiment of the present invention. As indicated above, upon startup of a process control application (e.g., process control application 202 or 300), a RootConfig object is instantiated to process an external configuration file (e.g., configuration file 203 or configuration tree 303). According to one embodiment, the external configuration file is written into a Modbus address space by a configuration device starting at an address specified at a preset address (e.g., Modbus address 41999). The first bytes of information in the external configuration file represent the RootConfig object. As such, during startup, process control application reads the hardcoded Modbus address to locate the Modbus address at which the RootConfig object is defined.

In the present example, a first data value of a set of data values 410 in the external configuration file is a rebuild flag. If this value is not equal to zero, then it is assumed that the data read from the external configuration file has been corrupted or otherwise misread and the external configuration file is reloaded into Modbus address space. If the rebuild flag is equal to zero, then processing of the configuration file data continues with the length of module list data value. This data value indicates how many module instances are to be created. The remaining data values (i.e., first module type, first module address, second module type, second module address), indicate the type of module that is to be instantiated, for example, by identifying it by number and the address offset within the configuration file at which the module configuration information (e.g., desired module parameter values) can be found. This pattern is repeated until the end of the module list is reached.

Figure 5:
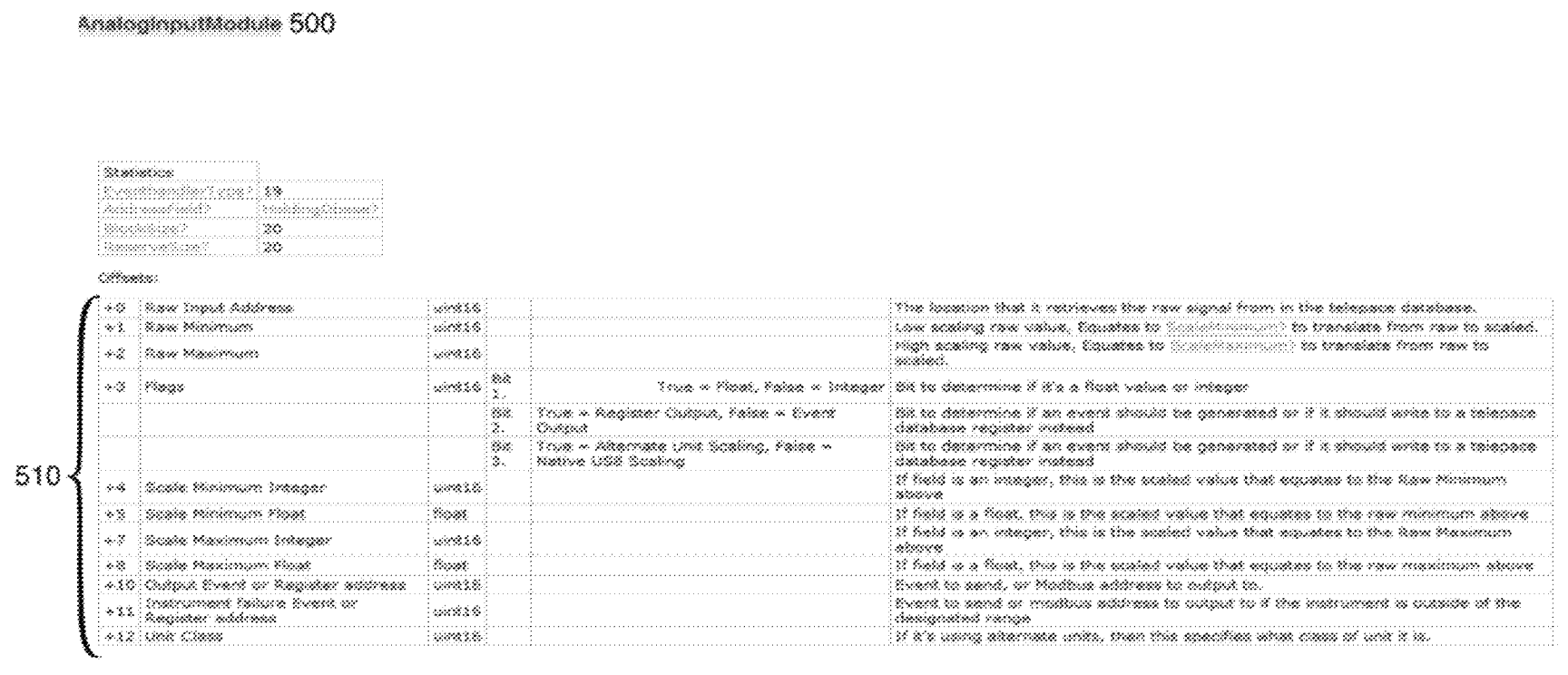

FIG. 5 illustrates a sample of an AnalogInputModule definition 500 in accordance with an embodiment of the present invention. According to the present example, data values 510 define various parameters of the desired instance of the analog input module (e.g., analog input module 350). In the present example, data values 510 include the following: a raw input address, a raw minimum, a raw maximum, a set of flags, a scale minimum integer, a scale minimum float, a scale maximum integer, a scale maximum float, an output event or register address, an instrument failure event or register address and a unit class In operation, during startup of process control application, these data values 510 are read from the external configuration file and understood with reference to module definition 500 and an appropriate analog input module instance configured in accordance with the data values 510 is created within process control application.

FIG. 6 illustrates a sample of a portion of an external Modbus configuration 600 based on the module definitions of FIGS. 4 and 5 in accordance with an embodiment of the present invention. According to this simplified example the external Modbus configuration 600 is represented in the form of two tables, a root module definition 610 and a leaf module definition 620, with intervening module definitions excluded for brevity. Root module definition 610 is represented in tabular form with Modbus addresses 611 in the left-hand column, values 612 stored at the corresponding Modbus addresses 611 in the middle column and notes 613 in the right-hand column. Similarly, Leaf module definition 620 is represented in tabular form with Modbus addresses 621 in the left-hand column, values 622 stored at the corresponding Modbus addresses 621 in the middle column and notes 623 in the right-hand column.

In operation, during startup of the process control application, root module definition 610 is initially located by the process control application initially retrieving the value stored at Modbus address 41999, which in the present example is 40501. The process control application, then begins reading the root portion of the configuration (i.e., root module definition 610) at Modbus address 40501.

According to the RootConfig module definition 400 (see FIG. 4), the first 16 bits of data (beginning at offset +0 from the base address of the RootConfig module definition 400 in the configuration file) are to be interpreted as a "Rebuild Flag" in the form of an unsigned integer. In the present example, the "Rebuild Flag" is 0.

According to the RootConfig module definition 400 (see FIG. 4), the next 16 bits of data (beginning at offset +1) are to be interpreted as a "Length of Module List" in the form of an unsigned integer. In the present example, the "Length of Module List" is 9—meaning the configuration file specifies 9 modules are to be instantiated by the process control application and are to be configured as further specified by the configuration file.

According to the RootConfig module definition 400 (see FIG. 4), the next 16 bits of data (beginning at offset +2) are to be interpreted as a "First Module Type" in the form of an unsigned integer. In the present example, the "First Module Type" is 7, which corresponds to an RTU info module.

According to the RootConfig module definition 400 (see FIG. 4), the next 16 bits of data (beginning at offset +3) are to be interpreted as a "First Module Address" in the form of an unsigned integer. In the present example, the "First Module Address" is 40640, which indicates data values specifying various parameters of the RTU info module begin at Modbus address 40640.

According to the RootConfig module definition 400 (see FIG. 4), the next 16 bits of data (beginning at offset +4) are to be interpreted as a "Second Module Type" in the form of an unsigned integer. In the present example, the "Second Module Type" is 23, which corresponds to a display power module.

According to the RootConfig module definition 400 (see FIG. 4), the next 16 bits of data (beginning at offset +5) are to be interpreted as a "Second Module Address" in the form of an unsigned integer. In the present example, the "Second Module Address" is 40630, which indicates data values specifying various parameters of the display power module begin at Modbus address 40630.

According to the RootConfig module definition 400 (see FIG. 4), the next 16 bits of data (beginning at offset +6) are to be interpreted as a "Third Module Type" in the form of an unsigned integer. In the present example, the "Third Module Type" is 19, which corresponds to an analog battery voltage input module.

According to the RootConfig module definition 400 (see FIG. 4), the next 16 bits of data (beginning at offset +7) are to be interpreted as a "Third Module Address" in the form of an unsigned integer. In the present example, the "Third Module Address" is 40680, which indicates data values specifying various parameters of the analog battery voltage input module begin at Modbus address 40630.

For purposes of simplicity, the forth through the eighth module definitions have been skipped in this example as indicated by the ellipsis between root module definition 610 and leaf module definition 620.

As such, the present discussion now continues with the last module definition (i.e., leaf module definition 620), representing the ninth (and last) module specified by the external configuration file.

According to the present example, the last module is an instance of an AnalogInputModule 500 (see FIG. 5). According to the AnalogInputModule definition 500 (see FIG. 5), the first 16 bits of data (beginning at offset +0 from the base address of the AnalogInputModule definition 500 in the configuration file) are to be interpreted as a "Raw Input Address" in the form of an unsigned integer. In the present example, the "Raw Input Address" is 30006.

According to the AnalogInputModule definition 500 (see FIG. 5), the next 16 bits of data (beginning at offset +1) are to be interpreted as a "Raw Minimum" in the form of an unsigned integer. In the present example, the "Raw Minimum" is 0.

According to the AnalogInputModule definition 500 (see FIG. 5), the next 16 bits of data (beginning at offset +2) are to be interpreted as a "Raw Maximum" in the form of an unsigned integer. In the present example, the "Raw Maximum" is 32767

According to the AnalogInputModule definition 500 (see FIG. 5), the next 16 bits of data (beginning at offset +3) are to be interpreted as a set of three "Flags" in the form of an unsigned integer. In the present example, the "Flags" value is 1.

According to the AnalogInputModule definition 500 (see FIG. 5), the next 16 bits of data (beginning at offset +4) are to be interpreted as a "Scale Minimum Integer" in the form of an unsigned integer. In the present example, the "Scale Minimum Integer" is 0.

According to the AnalogInputModule definition 500 (see FIG. 5), the next 32 bits of data (beginning at offset +5) are to be interpreted as a "Scale Minimum Float" in the form of a floating point value. In the present example, the "Scale Minimum Float" is 0.

According to the AnalogInputModule definition 500 (see FIG. 5), the next 16 bits of data (beginning at offset +7) are to be interpreted as a "Scale Maximum Integer" in the form of an unsigned integer. In the present example, the "Scale Maximum Integer" is 32.

According to the AnalogInputModule definition 500 (see FIG. 5), the next 32 bits of data (beginning at offset +8) are to be interpreted as a "Scale Maximum Float" in the form of a floating point value. In the present example, the "Scale Maximum Float" is 32.

According to the AnalogInputModule definition 500 (see FIG. 5), the next 16 bits of data (beginning at offset +10) are to be interpreted as an "Output Event or Register address" in the form of an unsigned integer. In the present example, the "Output Event or Register address" is 2006.

According to the AnalogInputModule definition 500 (see FIG. 5), the next 16 bits of data (beginning at offset +11) are to be interpreted as an "Instrument failure Event or Register address" in the form of an unsigned integer. In the present example, the "Instrument failure Event or Register address" is 0.

Figure 7:
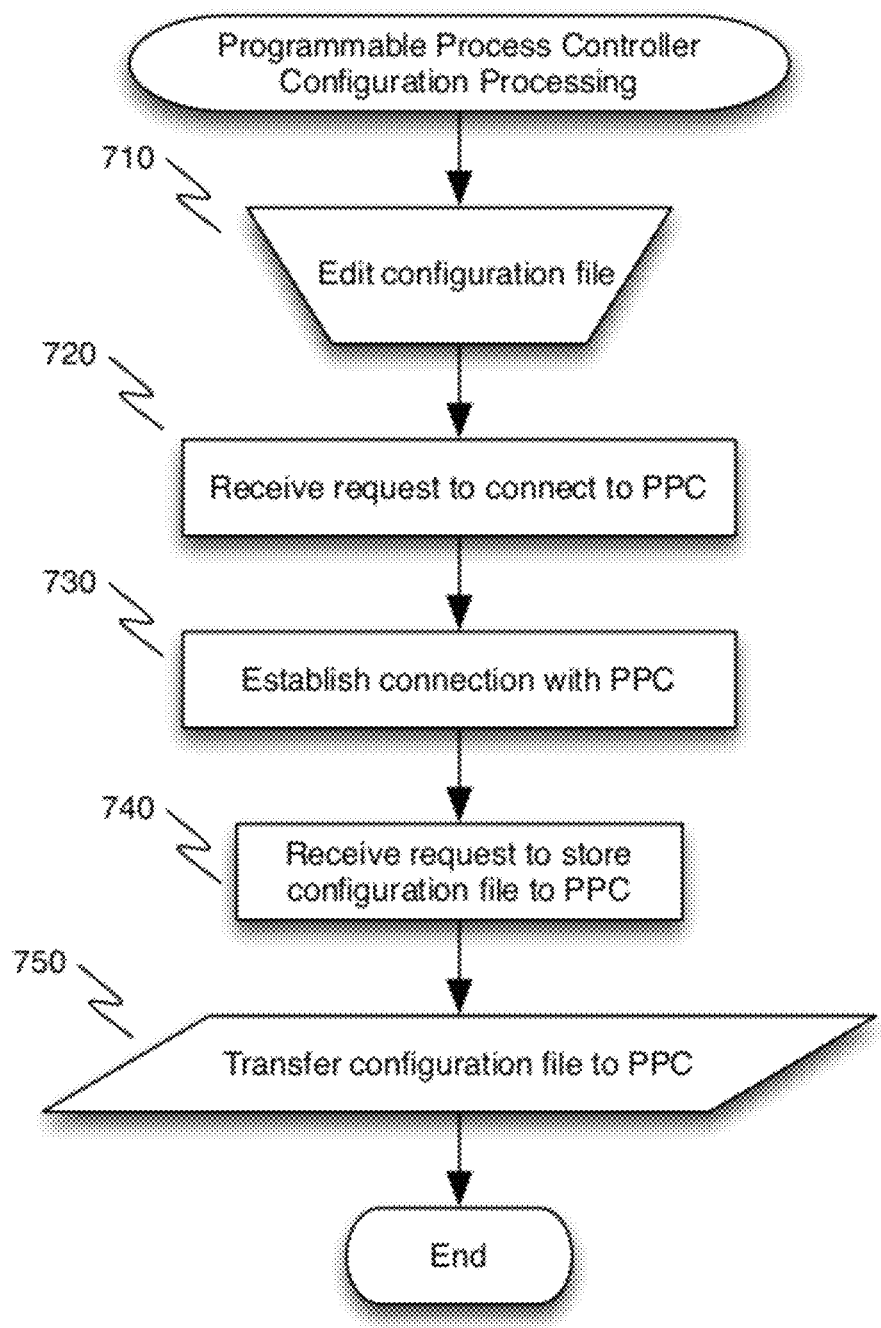
FIG. 7 is a flow diagram illustrating programmable process controller configuration processing in accordance with an embodiment of the present invention.

FIG. 7 is a flow diagram illustrating programmable process controller configuration processing in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 710, an end user of a configuration device manually edits a configuration file. The editing may be performed indirectly via a configuration file editing application or directly via a text editor (and without the use of a configuration utility). Notably, in one embodiment, the configuration file can be encrypted and secured for secure, defense, and/or Department of Homeland Security applications, for example.

At block 720, the configuration device receives a request to connect to a programmable process controller (PPC). In one embodiment, this request may be in the form of a user-initiated request for the configuration device to look for other discoverable Bluetooth capable devices in the area. In other embodiments, this request may be responsive to physically interfacing the configuration device with the PPC.

At block 730, a connection is established between the configuration device and the PPC.

At block 740, the configuration device receives a request to write the locally stored configuration file to the PPC. In one embodiment, this is a user-initiated request from a configuration utility, such as that discussed below with reference to FIG. 10. In other embodiments, this request may indirectly result from an operating system or file system request responsive to user-initiated activity with respect to the configuration file (e.g., a request to move the configuration file to the PPC, a request to copy/cut from the configuration device and paste to the PPC or the like). The request may also be initiated by a technician from the PPC via a command line or other interface. Alternatively, the request may be initiated by a process control application running on the PPC.

At block 750, the configuration file is transferred to the PPC. In one embodiment, the configuration file is written (pushed) to a Modbus address space. In other embodiments, a process control application may read (pull) the configuration file during startup processing.

While the simplified example above, simply illustrates the ability for a configuration file to be written to a PPC. In alternative embodiments, as described further below, the configuration device may also permit a configuration file to be retrieved from the PPC, edited and then written back to the PPC.

Figure 8:
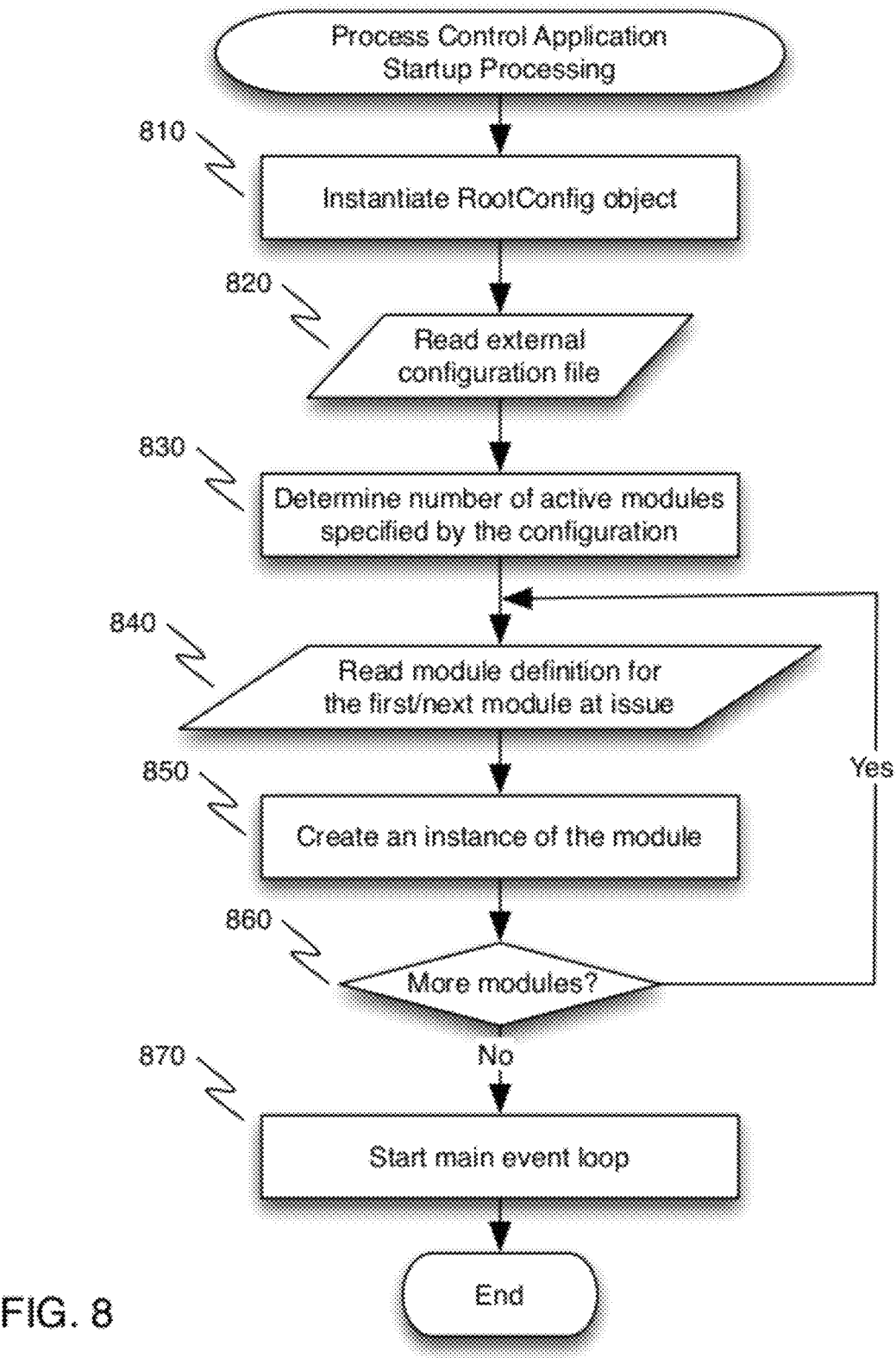
FIG. 8 is a flow diagram illustrating process control application startup processing in accordance with an embodiment of the present invention.

FIG. 8 is a flow diagram illustrating process control application startup processing in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. According to the present example, the process control application has already begun its startup processing by locating the base address of the root portion of an external configuration file by reading the base address from a hard-coded Modbus address, for example.

At block 810, the process control application instantiates a RootConfig object to process the root portion of an external configuration file. In one embodiment, the root portion contains information specifying the number, type and location of parameter values of modules that are to be instantiated.

At block 820, the RootConfig object begins reading the external configuration file.

At block 830, the RootConfig object parses the data retrieved from the external configuration file in accordance with a root configuration definition (e.g., RootConfig 400) to determine the number of active modules that are specified by the external configuration file.

At block 840, the RootConfig object enters a loop in which it reads module definitions for each of the active modules.

Once a complete set of parameter values have been read for the module at issue, at block 850, the RootConfig object creates an instance of the module configured in accordance with the parameter values.

At decision block 860, it is determined whether there are additional modules to be processed and instantiated. If additional modules remain to be processed, then process control application startup processing loops back to block 840; otherwise all desired modules have been instantiated and processing continues with block 870.

At block 870, all modules specified by the external configuration file have been instantiated, therefore the main event loop is started. After the main event loop has been started, process control application startup processing is complete.

Figure 9:
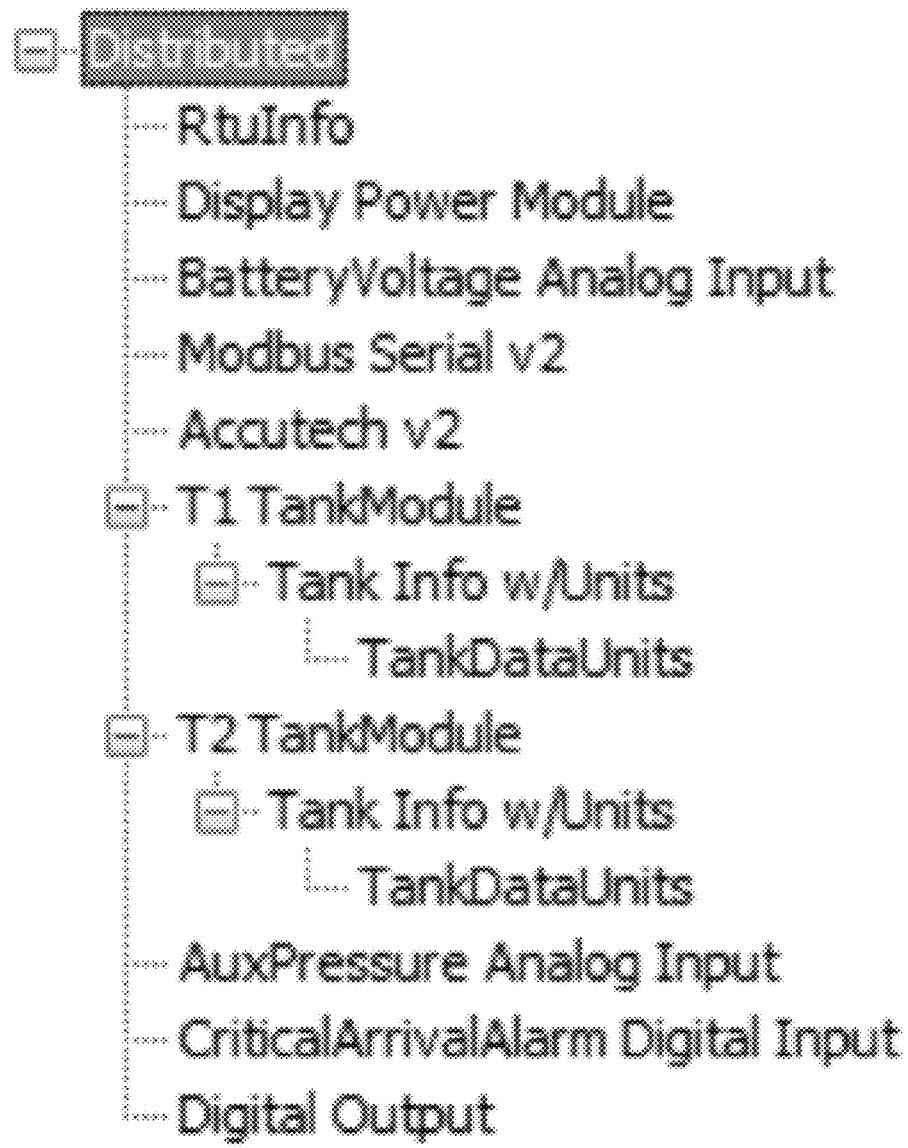
FIG. 9 is an example of a representation of configuration tree in accordance with an embodiment of the present invention.

FIG. 9 is an example of a representation of a configuration tree 900 in accordance with an embodiment of the present invention. This hierarchical view of configuration tree 900 is shown simply to note that while some embodiments may represent configuration information in the form of a particular data structure which is to be interpreted in accordance with various module definitions, in alternative embodiments, the hierarchical nature of the modules and associated parameter values may naturally lend themselves to use of an XML representation.

Figure 10:
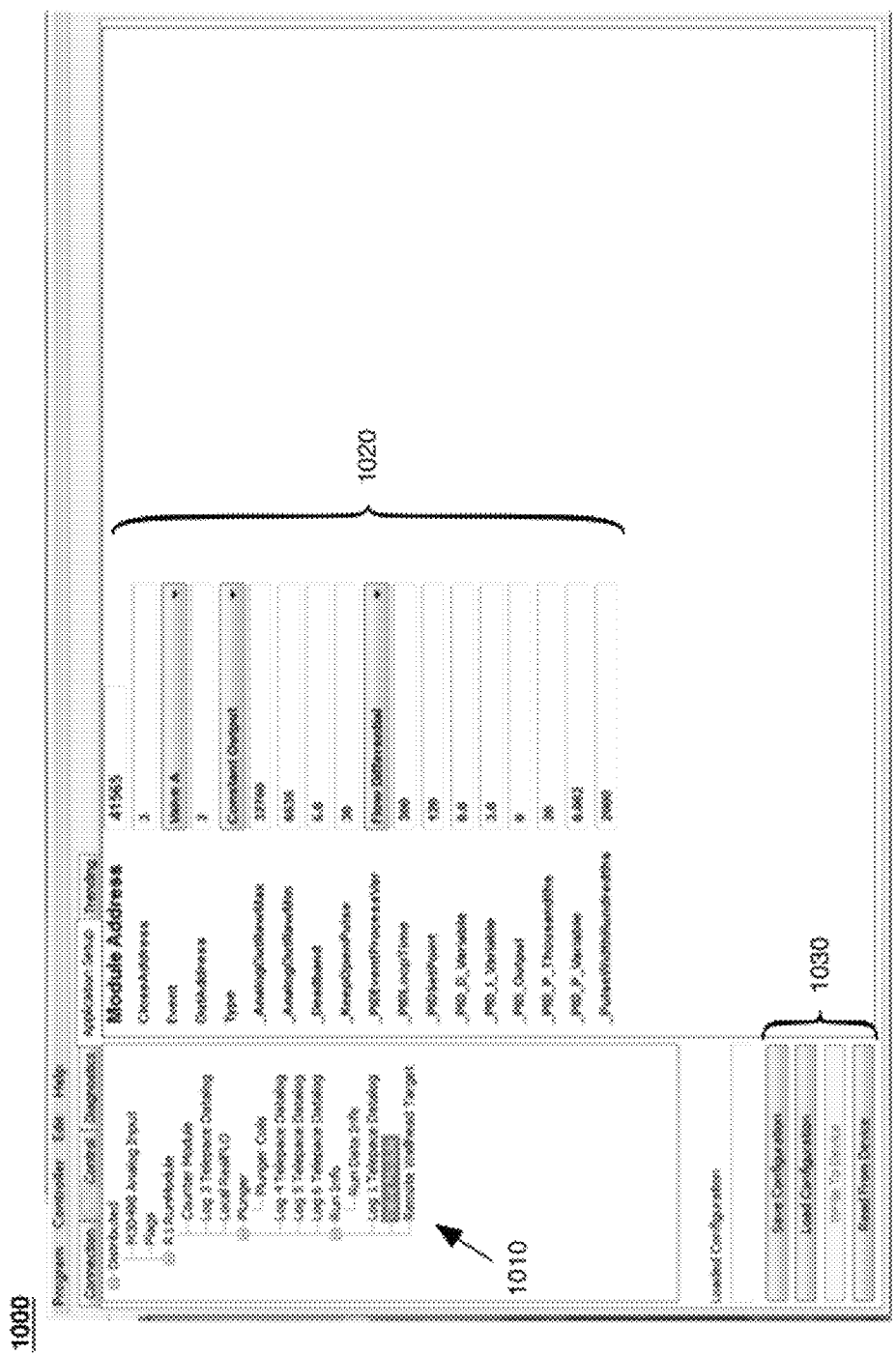
FIG. 10 is a screen shot of a configuration file editing application in accordance with an embodiment of the present invention.

FIG. 10 is a screen shot 1000 of a configuration file editing application in accordance with an embodiment of the present invention. According to this example, the configuration file editing application may allow a technician to add, delete and/or modify existing module definitions displayed in the context of a configuration tree 1010 by using familiar user interface mechanisms 1020, such as text entry fields, drop down lists and the like. Buttons 1030 may be used to (i) save the current configuration to a file stored on the configuration device, for example; (ii) load a configuration from a file stored on the configuration device, for example; (iii) write the current configuration file to a connected PPC, for example; and/or (iv) read the currently employed configuration file from a connected PPC, for example.

Figure 11:
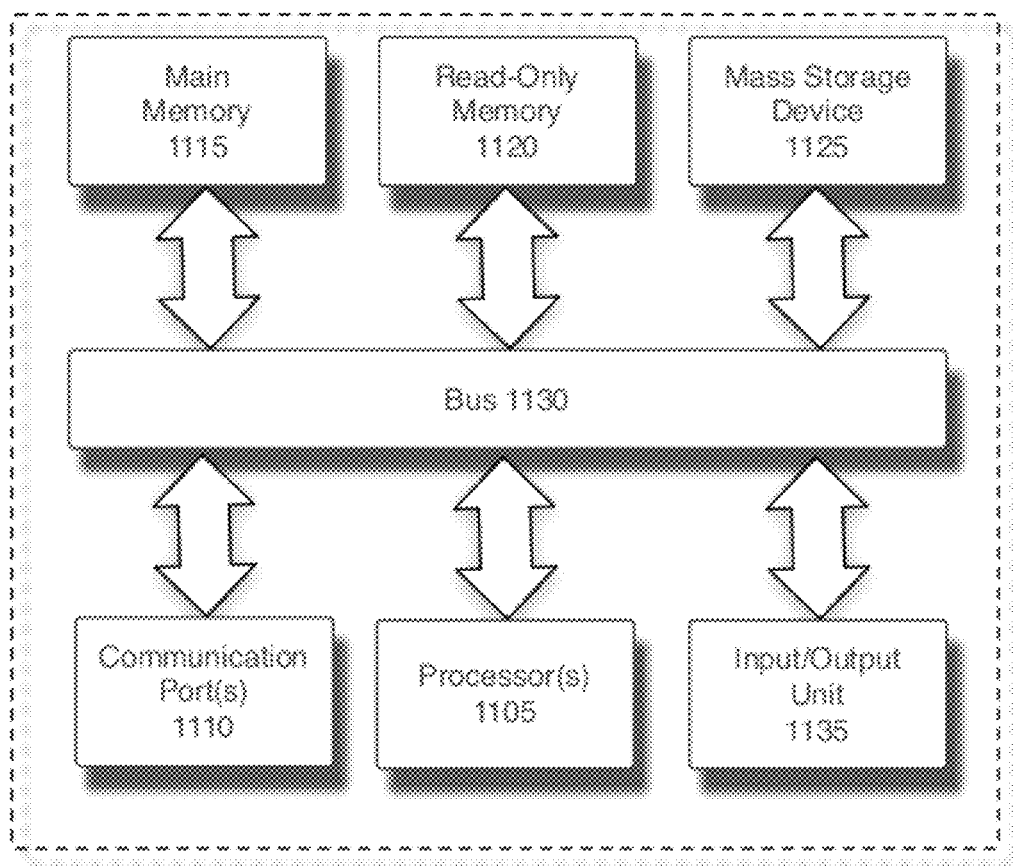
FIG. 11 is an example of a computer system with which embodiments of the present invention may be utilized.

FIG. 11 is an example of a computer system with which embodiments of the present invention may be utilized. The computer system 1100 may represent or form a part of a PLC, RTU, wireless mobile device and/or workstation.

Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

According to FIG. 11, the computer system includes a bus 1130, one or more processors 1105, one or more communication ports 1110, a main memory 1115, an optional removable storage media (not shown), a read only memory 1120, an optional mass storage device 1125 and an optional input/output unit In the context of a wireless mobile device and/or a workstation, processor(s) 1105 can be any future or existing processor, including, but not limited to, an Intel® Itanium® or Itanium 2 processor(s), or AMD® Opteron® or Athlon MP® processor(s), or Motorola® lines of processors.

In the context of a programmable process controller (e.g., a PLC, an RTU or the like), processor(s) 1105 are typically hardened to withstand vibrations, temperature, humidity, noise and other adverse conditions that may be present in an industrial, manufacturing or other environments in which such controllers may be deployed. For example, in one embodiment, the processor(s) 1105 can be a current or future processor from the Control Microsystems or Schneider Electric SCADAPack family of controllers, MicroLogix, CompactLogix or ControlLogix families of processors (available from Allen Bradely, Inc.), the Siemens simatic Micromaster PLC future or existing processor, including, but not limited to, an Intel® Itanium® or Itanium 2 processor(s), or AMD® Opteron® or Athlon MP® processor(s), or Motorola® lines of processors.

Communication port(s) 1110 can be any of an RS-232 port for use with a modem based dialup connection or a physical connection to another RS-232 enabled device, a 10/100 Ethernet port, a Gigabit port using copper or fiber, a short-range wireless communications chip/chipset (e.g., an integrated Bluetooth radio) or other existing or future ports. Communication port(s) 1110 may be chosen depending on a network, such a control network, Local Area Network (LAN), Wide Area Network (WAN), or any network to which the computer system 1100 connects.

Main memory 1115 can be Random Access Memory (RAM), or any other dynamic storage device(s) commonly known in the art. Read only memory 1120 can be any static storage device(s) such as Programmable Read Only Memory (PROM) chips for storing static information such as start-up or BIOS instructions for processor 1105.

In the context of a wireless mobile device and/or a workstation, the optional mass storage device 1125 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1130 communicatively couples processor(s) 1105 with the other memory, storage and communication blocks. Bus 1130 can include a bus, such as a Peripheral Component Interconnect (PCI)/PCI Extended (PCI-X), Small Computer System Interface (SCSI), USB or the like, for connecting expansion cards, drives and other subsystems as well as other buses, such a front side bus (FSB), which connects the processor(s) 1105 to system memory. In the context of a chassis-based system, bus 1130 may represent a backplane through which both control and data signals are passed among modules of the chassis.

Optionally, local operator and administrative interfaces, such as a display, keyboard, touch screen and/or a cursor control device, may also be coupled to bus 1130 to support direct operator interaction with computer system 1100. Other operator and administrative interfaces (e.g., browser based or command line) can be provided through network connections connected through communication ports 1110.

Optional removable storage media (not shown) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

In the context of a programmable process controller (e.g., a PLC, an RTU or the like), input/output unit 1135 allow processor 1105 to receive information from external devices (e.g., field devices/instrumentation 111a-111n) and communicate information to such external devices. Depending upon the usage context, The inputs might be from switches, or other sensors, such as photoelectric cells, temperature sensors, flow sensors, or the like. The outputs might be to motor starter coils, solenoid valves, or similar things Components described above are meant only to exemplify various possibilities. In no way should the aforementioned exemplary computer system limit the scope of the invention.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method of reconfiguring a process control application stored in a memory of a programmable process controller for well automation, the method comprising:

providing a process control application in the programmable process controller having a collection of modules, each of which performs a predetermined set of tasks/operations with respect to well automation components, said process control application automatically configuring itself by creating a dynamic structure of the desired number and configuration of said modules in response to a configuration file;

reading, by a configuration device, a new configuration file from a memory of the configuration device, the new configuration file containing information regarding a desired number of instances and desired configurations of modules of the process control application for the programmable process controller reflecting the configuration of well automation components; and causing, by the configuration device, the process control application in the programmable process controller to instantiate the desired number of instances of the modules with the desired configurations by replacing an existing external configuration file stored in the memory of the programmable process controller with the new configuration file.

2. The method of claim 1, wherein the programmable process controller comprises a Remote Terminal Unit (RTU).

3. The method of claim 1, wherein the programmable process controller comprises a Programmable Logic Controller (PLC).

4. The method of claim 3, wherein the PLC is selected from a group comprising a SCADAPack PLC, RTU or SCADASense Transmitter, Modicon Quantum PLC, a Modicon Premium PLC, a Modicon Momentum PLC, a Modicon M168 PLC, a Modicon M238, a Modicon M258 PLC, a Modicon LMCO58 motion controller and a Modicon TSX Micro PLC.

5. The method of claim 3, wherein the PLC includes an integrated short-range wireless radio.

6. The method of claim 5, wherein the integrated short-range wireless radio comprises a Bluetooth radio.

7. The method of claim 3, wherein the PLC includes a web server.

8. The method of claim 1, wherein the configuration device comprises a wireless mobile device.

9. The method of claim 8, wherein the wireless mobile device is selected from a group comprising a smart phone, a tablet computer and a laptop computer.

10. A process control architecture for well automation comprising:
    a data bus;
    at least two programmable process controllers residing on the data bus;
    a process control application installed on each of the at least two programmable process controllers, said process control application having a collection of modules, each of which performs a predetermined set of tasks/operations with respect to well automation components, said process control application automatically configuring itself by creating a dynamic structure of the desired number and configuration of said modules in response to a configuration file; and
    wherein, upon startup of the process control application, the at least two programmable process controllers each dynamically build different configurations of the process control application having differing numbers of instances of modules reflecting the configurations of well automation components for the at least two programmable process controllers as a result of the at least two programmable process controllers having different configuration files.

11. The process control architecture of claim 10, wherein the at least two programmable process controllers comprise a first Programmable Logic Controller (PLC) from a first family of PLCs sold by a PLC distributer and a second PLC from a second family of PLCs sold by the PLC distributer.

12. The process control architecture of claim 10, wherein the a main program of the process control application provides compatibility across a plurality of hardware platforms by a main program of the process control application instantiating a configuration object specialized for a hardware platform of the plurality of hardware platforms for which the process control application is compiled.

13. The process control architecture of claim 10, wherein the at least two programmable process controllers comprise a Programmable Logic Controller (PLC) and a Remote Terminal Unit (RTU).

14. A method comprising:
    providing a process control application running on a programmable process controller for well automation, said process control application having a collection of modules, each of which performs a predetermined set of tasks / operations with respect to well automation components, said process control application automatically configuring itself by creating a dynamic structure of the desired number and configuration of said modules in response to a configuration file;
    during startup of the process control application running on a programmable process controller for well automation, reading a configuration file associated with the process control application, the configuration file defining a number of instances and configurations of modules of the process control application for the programmable process controller reflecting the configuration of well automation components; and
    instantiating, by the process control application, the defined number of instances of the modules with the defined configurations.

15. The method of claim 14, wherein the programmable process controller comprises a Programmable Logic Controller (PLC) or a Remote Terminal Unit (RTU).

16. The method of claim 15, further comprising:
    receiving, by the programmable process controller, a new configuration file from a configuration device; and
    during a second startup of the process control application, reading the new configuration file and responsive thereto instantiating, by the process control application, a number of instances of the modules different from the defined number and having configurations specified by the new configuration file.

17. The method of claim 14, wherein the configuration device comprises a wireless mobile device.

18. The method of claim 17, wherein the wireless mobile device is selected from a group comprising a smart phone, a tablet computer and a laptop computer.

* * * * *